(12) United States Patent
Hartman

(10) Patent No.: US 6,188,032 B1
(45) Date of Patent: Feb. 13, 2001

(54) STACKING, SELF-CLEANING CD HOLDER

(76) Inventor: Erick V. Hartman, 9303 Bales Dr., Apt. 304, Kansas City, MO (US) 64132

(*) Notice: Under 35 U.S.C. 154(b), the term of this patent shall be extended for 0 days.

(21) Appl. No.: 09/413,305

(22) Filed: Oct. 6, 1999

(51) Int. Cl.[7] .................................................. B65D 85/57
(52) U.S. Cl. ........................ 200/308.1; 206/509; 206/503
(58) Field of Search ................................ 206/308.1, 312, 206/387.12, 503, 509; 312/9.45, 9.46, 9.48, 9.58

(56) References Cited

U.S. PATENT DOCUMENTS

| | | |
|---|---|---|
| 4,238,030 | 12/1980 | Maylandt . |
| 4,254,864 | 3/1981 | Mikura . |
| 4,327,831 | 5/1982 | Inaba . |
| 4,339,034 | 7/1982 | Panveno . |
| 4,365,708 | 12/1982 | Tyus . |
| 4,413,298 | 11/1983 | Pecsok . |
| 4,610,352 | 9/1986 | Howey . |
| 4,778,047 | 10/1988 | Lay . |
| 4,881,640 * | 11/1989 | Herr et al. ............................ 206/313 |
| 4,971,195 | 11/1990 | Mitsuyama . |
| 4,998,618 | 3/1991 | Borgions . |
| 5,122,919 | 6/1992 | Takemae . |
| 5,147,036 | 9/1992 | Jacobs . |
| 5,207,717 | 5/1993 | Manning . |
| 5,269,409 | 12/1993 | Brandt . |
| 5,285,893 | 2/1994 | Misterka . |
| 5,360,107 * | 11/1994 | Chasin et al. ....................... 206/308.1 |
| 5,542,531 | 8/1996 | Yeung . |
| 5,590,767 | 1/1997 | Li . |
| 5,842,563 * | 12/1998 | Herr et al. .......................... 206/308.1 |
| 5,936,935 * | 8/1999 | Hanakawa et al. .................. 206/509 |
| 5,944,180 * | 8/1999 | Koh et al. ............................ 206/312 |

* cited by examiner

*Primary Examiner*—David T. Fidei
(74) *Attorney, Agent, or Firm*—Shughart Thomson & Kilroy P.C.; Mark E. Brown

(57) ABSTRACT

A stacking, self-cleaning CD holder assembly includes a plurality of CD and CD booklet receptacles which are flattened and square in shape and a plurality of sets of corner connectors which connect to the receptacles and connect among the connectors. The receptacles have mitered corners with receptacle tongues extending therealong. The connectors have respective receptacle grooves, connector tongues, and connector grooves formed therein and thereon. The corner connectors releasably attach to the corners of a receptacle by engagement of the receptacle tongue and groove and releasably connect to corner connectors of other receptacles by engagement of the respective connector tongues and grooves. The receptacles have internal walls shaped to conform to a compact disc or a booklet from a CD package. The CD receptacles have cleaning pads positioned therein for engagement by a CD when inserted into or withdrawn from a CD receptacle.

20 Claims, 3 Drawing Sheets

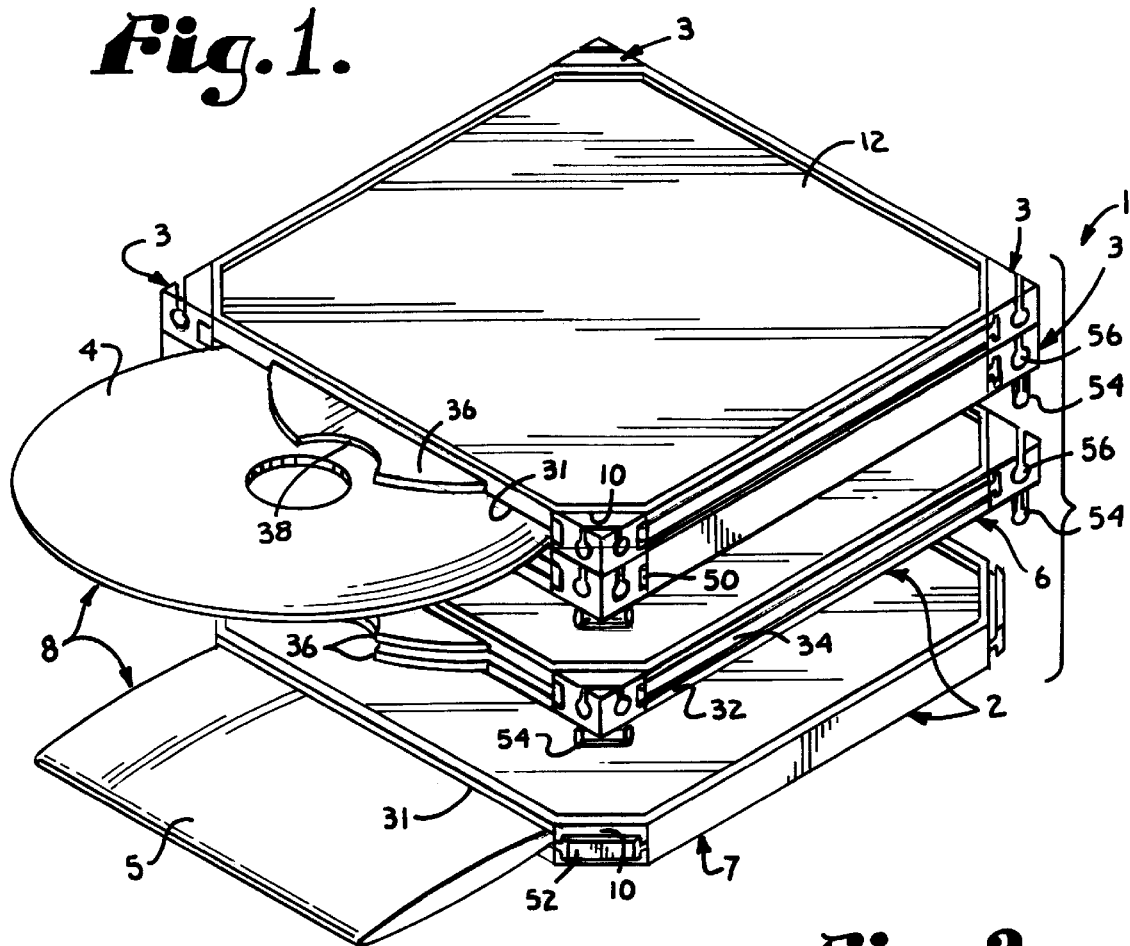
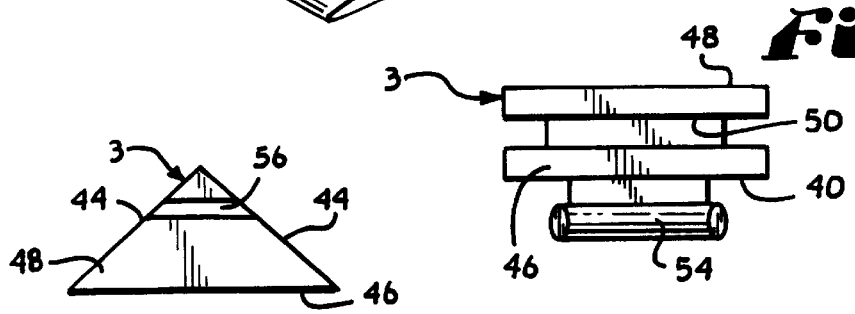
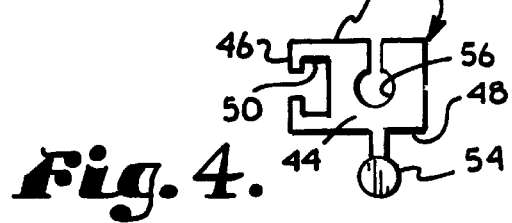

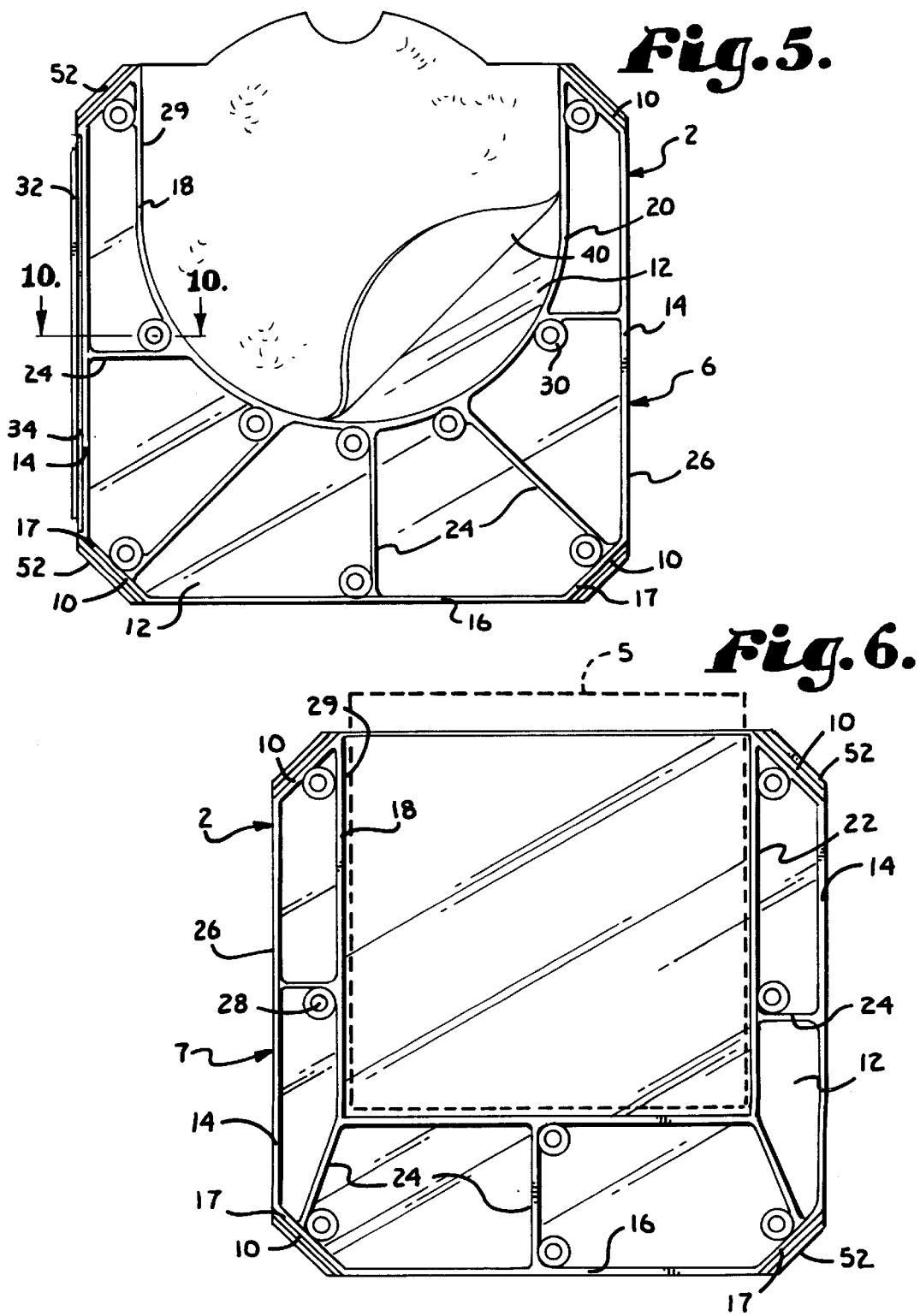

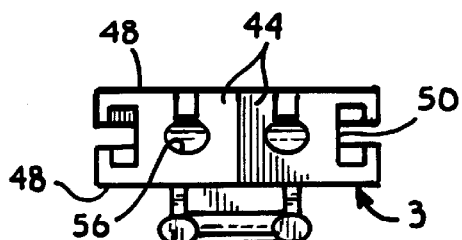
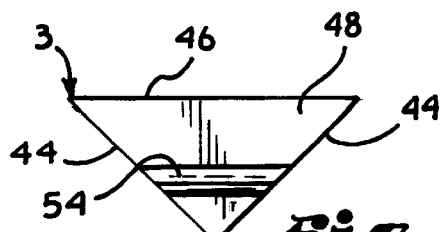
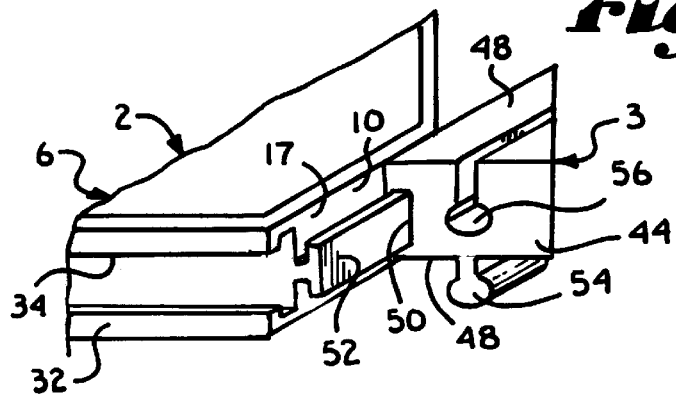
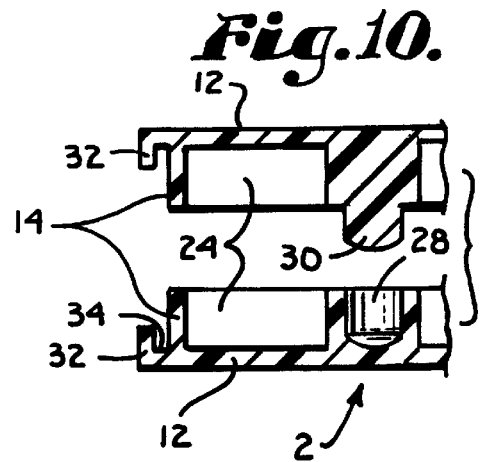

STACKING, SELF-CLEANING CD HOLDER

BACKGROUND OF THE INVENTION

Currently the compact disc or CD is the medium of choice for recorded music as well as computer software. A compact disc has digital data forming the music or software impressed thereon as pits which are read by a laser mechanism. CD's are typically purchased in flattened, hinged cases, commonly referred to as "jewel boxes", although other protective means are sometimes employed. A typical musical CD package includes a "booklet", describing the recorded music, stored in the front half of the jewel box and the CD and a rear label in a rear half of the jewel box. The booklet often functions as a front label. The jewel box may also include edge labels in the side edges of the jewel box. Jewel boxes are usually formed of clear transparent plastic which allows the booklet and labels to be viewed through corresponding walls of the jewel boxes. Jewel boxes for computer software distributed on CD's may be arranged in a manner similar to musical CD's.

Although jewel boxes function well in protecting CD's stored therein, they are somewhat inconvenient when it comes to opening them, removing and replacing the disc, and removing and replacing the booklet. The CD is retained in place within a jewel box by a resilient "post" onto which the CD is snapped. It is advisable to avoid touching the underside of the CD, because data impressed thereon can be made unreadable by skin oils and the like.

There are a number of types of structures or racks for holding a plurality of CD's at a location convenient to a CD player or deck. Some types have slots sized to allow a CD within a jewel box to be placed therein. The usual problem with such a type of rack is that it must be orientationally stable; otherwise a tilt of the rack in the wrong direction will allow a number of the jewel boxes to slide out. Other types are adapted to receive only the CD itself, without the jewel box or accompanying literature. This may be appropriate for a portable CD holder, but it is often inconvenient for use in a fixed location. Additionally, separation of the CD from its jewel box and literature may result in misplacement of the jewel box and literature. With both jewel box racks and conventional CD holders, only a given number of jewel boxes or CD's may be stored therein. When the maximum number of jewel boxes or CD's have been stored in such structures, another structure must be obtained for any additional jewel boxes or CD's.

SUMMARY OF THE INVENTION

The present invention provides a modular CD holder system which not only holds CD's but the CD booklets as well. In addition, the CD holders incorporate cleaning pads for the CD's to maintain their playability by simply removing the CD's and replacing them.

The CD holder system includes CD holders and booklet holders which are similar in configuration. Each holder is approximately the size of a conventional jewel box. The holders are internally configured to receive a compact disc and a typical type of CD booklet respectively. A CD and a booklet extends partially out of their respective holders to facilitate grasping them for removal. The CD and booklet holders of the present invention have releasable corner joiners which allow the holders to be modularly joined. Any number of CD holders and/or booklet holders can be interconnected to effectively form a CD and CD booklet holder rack.

The holder structures are approximately square with the corners mitered. Each corner has a holder tongue extending along the mitered or beveled edge. A right triangular corner joiner member has a holder groove extending along a hypotenuse surface thereof, the holder groove having a cross sectional shape compatible with that of the holder tongue. The joiner member also has a joiner tongue and a joiner groove formed along opposite faces of the joiner member. A joiner member is received on each of the holder beveled edges by engagement of the holder groove with the respective holder tongue. The joiner member tongue and groove enable the joiner members of one holder to interconnect with the joiner members of another holder, whereby various CD and booklet holders can be selectively stacked in any desired order.

OBJECTS AND ADVANTAGES OF THE INVENTION

The principal objects of the present invention are: to provide an improved structure for storing compact discs and booklets from CD packages; to provide such a structure which is a modularly expandible assembly in which individual receptacles can be connected to form a CD holder rack; to provide such an assembly including a plurality of CD and booklet receptacles joined by corner connectors member, each receptacle being internally configured to receive respectively a CD or a booklet therein; to provide such an assembly in which each receptacle is generally square with its corners mitered and with an elongated receptacle tongue extending along the beveled edge formed by each miter; to provide such an assembly in which each connector member has an elongated receptacle groove extending therealong which is compatible with the receptacle groove; to provide such an assembly in which each connector member has a connector tongue and a connector groove extending therealong which enable the connector member to be connected to another connector member; to provide such an assembly in which each connector member is of a prismatic shape having an isosceles right triangular with leg surfaces, a hypotenuse surface, and side faces such that four connector members complete the square shape of the receptacle member; to provide such an assembly in which each connector member has the receptacle formed along the hypotenuse surface, the connector tongue formed along one side face parallel to the hypotenuse surface, and the connector groove formed into and along the opposite side face parallel to the hypotenuse surface; to provide such an assembly in which the receptacle members are internally configured so that the CD or booklet positioned therein protrudes somewhat from the receptacle members to facilitate gripping a CD or booklet for removal therefrom; to provide such an assembly in which each CD receptacle has a pair of cleaning pads positioned therein to frictionally engage a compact disc positioned within the receptacle to thereby clean the disc upon insertion into or removal from the receptacle; and to provide such a stacking, self-cleaning CD holder which is economical to manufacture, which is convenient in use, and which is particularly well adapted for its intended purpose.

Other objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 1 is an exploded perspective view of an assembly of compact disc and booklet holders and corner connectors which embodies the present invention.

FIG. 2 an enlarged elevational view of a corner connector of the assembly of the present invention shown from the inside the connector.

FIG. 3 is a plan view of a connector of the present invention shown from a connector groove face of connector.

FIG. 4 is an end elevational view of a connector of the present invention illustrating the connector tongue and grooves of the connector.

FIG. 5 is a cross sectional view of a CD receptacle at a reduced scale and showing internal detail of the CD receptacle including a cleaning pad.

FIG. 6 is a view similar to FIG. 5 and illustrates internal details of a booklet receptacle of the assembly of the present invention.

FIG. 7 is an elevational view of a connector of the present invention shown from the point of view of a corner of the connector.

FIG. 8 is a plan view of a connector of the present invention similar to FIG. 3 and showing a connector tongue face of the connector.

FIG. 9 is a fragmentary perspective view of the corner region of a receptacle and illustrating cooperation of a receptacle groove of a connector and a receptacle tongue of a receptacle of the present invention.

FIG. 10 is greatly enlarged cross sectional view taken on line 10—10 of FIG. 5 and illustrating walls forming a spine label channel of a receptacle along with pin and socket members of the receptacle which register halves of the receptacle during assembly thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a stacking, self-cleaning compact disc holder assembly which embodies the present invention. The assembly 1 generally includes a plurality of receptacle members 2 for compact discs (CD's) and booklets from compact disc packages (not shown) which are interconnected by corner connectors 3 to form the modular holder assembly 1.

The receptacles 2 are internally configured to receive compact discs 4 or booklets 5 therein. As illustrated in FIGS. 1, 5, and 6, the receptacles 2 include CD receptacles 6 and booklet receptacles 7. A CD 4 or a booklet 5 are generally referred to herein as a content member 8 of a compact disc package and also as recorded media. A CD 4 has musical or other data recorded thereon by a physical process, while a booklet 5 has text and graphics recorded thereon by printing.

Referring to FIGS. 1, 5, and 6, the receptacles 2 are generally square in shape with mitered or beveled corners 10. Each receptacle 2 has opposite face walls 12, side walls 14, an end wall 16, and miter walls 17. The receptacles 2 have content conforming internal walls 18 extending along the face walls 12 which conform to the CD 4 or booklet 5 intended to be carried by the particular receptacle 2. The illustrated CD receptacle 4 has a rounded, U-shaped internal wall 20, while the illustrated booklet receptacle 7 has a rectangular U-shaped internal wall 22. Alternatively, both internal walls 20 and 22 could be rectangular. Internal ribs 24 extend between the internal walls 18 and the outer walls 14, 16, and 17 on the face walls 12 and, in cooperation with the internal walls 18, reinforce the face walls 12.

The illustrated receptacles 2 are preferably formed of transparent plastic in receptacle half sets, one half 26 of each set being shown in FIGS. 5 and 6. The halves 26 are assembled as by glueing, ultrasonic welding, or the like. The opposite receptacle halves 26 may include sockets 28 and pegs 30 (FIG. 10) which properly locate the halves 26 of a receptacle 2 for assembly. The sockets 28 and pegs 30 may also function as glueing or welding locations during assembly. When assembled, the receptacle halves 26 have the opposite face walls 12 positioned in spaced relation to form a content member chamber 29 therein with an entry slot 31 at the external edges of the chamber 29. The chamber 29 is formed within the bonds of the internal walls 18.

The CD receptacle 6 includes walls 32 forming a spine label receiving channel 34 (FIGS. 5 and 10). The illustrated spine channel 34 is formed on one of the side walls 14 of the CD receptacle 6 and is provided to receive a thin spine label (not shown) identifying the CD 4 which is stored in the receptacle 6, which may be a part of the original CD package in which the CD 4 was packaged and sold.

As shown in FIG. 1, each CD receptacle 6 has a pair of notched CD guard tabs 36 extending from the face walls 12. The tabs 36 have finger notches 38 formed therein. The tabs 36 have a truncated disc shape of approximately the same radius as the CD's 4 and are positioned at the access slots 31 of the CD receptacle 6. The tabs 36 are provided to protect the CD's 4 stored in the receptacle 6 while providing grasping access thereto by the notches 38. The booklet receptacles 7 could be provided with similar tabs, only rectangularly shaped. However, the booklets 5 do not require the same degree of protection as the CD's 4 and, for this reason, no such tabs are provided for the booklet receptacles 7 in the preferred embodiment of the assembly 1.

Referring to FIG. 5, the CD receptacles are provided with cleaning pads 40 in the content member chamber 29 which conform to the combined shapes of the U-shaped wall 20 and the tabs 36. The pad 40 is adhered to an inner surface of the face wall 12 of each half 26 of the CD receptacle 6 within the chamber 29. The pads are preferably formed of a velvet-like fabric somewhat similar to the type of fabric provided in older type floppy discs and serve to clean a CD 4 as it is inserted into or withdrawn from a CD receptacle 6, by frictional contact. Frictional contact between the pads 40 and a CD 4 in the Chamber 29 also tends to retain the CD 4 within the receptacle 6, should the entry slot 31 be tilted downwardly.

Referring particularly to FIGS. 2–4 and 7–9, each of the corner connectors 3 has a triangular, prismatic shape which complements the mitered corners 10 of the receptacles 2. Each corner connector 3 has a pair of leg surfaces 44 positioned in perpendicular relation and a hypotenuse surface 46 positioned at 45 degrees to each of the leg surfaces 44. The connectors 3 have face surfaces 48 positioned at right angles to the leg surfaces 44 and the hypotenuse surface 46.

A receptacle groove 50 is formed in the connectors 3 parallel to the hypotenuse surface 46 and opening thereonto. The receptacle groove 50 is sized and shaped to receive a receptacle tongue 52 formed on each of the walls 17 of the mitered corners 10 of a receptacle 2. The receptacle tongue 52 and groove 50 provide structure for releasably connecting the corner connectors 3 with the receptacle members 2. Each corner connector 3 also has a connector tongue 54 and connector groove 56 formed thereon. The tongue 54 is positioned on one of the face surfaces 48 of a connector member 3, while the groove 56 is formed into an opposite face surface 48 of the connector 3. The tongue 54 and groove 56 extend parallel to the hypotenuse surface 46 of the connector member 3 and provide for releasable connection of each connector member 3 to another connector 3.

The illustrated tongue 52 and groove 50 are rectangular in cross section while the connector tongue 54 and groove 56 are cylindrical in cross section. Alternatively, the tongues 52 and 54 and the grooves 50 and 56 could have other cross sectional shapes.

In use of the CD holder assembly 1 of the present invention, two or more receptacles 2 are positioned with their face walls 12 in close proximity and with their entry slots 31 opening in the same direction. Any mix of CD receptacles 6 and/or booklet receptacles 7 can be used in any desired order. For each pair of receptacles 2, for corner connectors 3 are used. The four connectors 3 are positioned on the mitered corners 10 of one of the receptacles 2 by engaging the receptacle groove 50 of each connector 3 with a receptacle tongue 52 of the receptacle 2. A second set of four connectors 3 is used to connect between a second receptacle 2 and the connectors 3 of the first receptacle 2. A small degree of coordination is required to simultaneously engage the receptacle tongue and groove 52/50 of each connector 3 and the connector tongue and groove 54/56. However, in practice, this amounts to no great difficulty.

The process is repeated for each additional receptacle 2 which is joined to the assembly 1. Once the receptacles 2 are joined, the assembly 1 can be oriented with the receptacles 2 horizontal or vertical. A particularly useful arrangement is to alternate CD receptacles 6 and booklet receptacles 7, allowing the CD 4 and booklet 5 of a conventional CD package to be placed in side-by-side relation.

Although a preferred structure for connecting the receptacles 2 using the connectors 3 has been described and illustrated, it is foreseen that other equivalent structure could be employed. Therefore, it is to be understood that while certain forms of the present invention have been illustrated and described herein, it is not to be limited to the specific forms or arrangement of parts described and shown.

What is claimed and desired to secure by Letters Patent is:

1. A stacking holder assembly for a recorded medium and comprising:
    (a) a recorded medium holder member sized and shaped to receive a recorded medium therein;
    (b) said holder member including one element of a complementary set of an elongated tongue element and an elongated groove element extending along an edge of said holder member;
    (c) a connector member releasably engaged with said holder member and adapted to modularly and releasably interconnect said holder member with another recorded medium holder member;
    (d) said connector member including a complementary element of said complementary set of a tongue element and a groove element which is complementary to said one element on said holder member;
    (e) engagement of said elements of said complementary set of a tongue element and a groove element enabling releasable connection of said connector member to said holder member;
    (g) said connector member further including:
        (1) an elongated connector tongue extending thereal- ong;
        (2) an elongated connector groove extending thereal- ong; and
    (h) engagement of a connector tongue of one connector member with a connector groove of another connector member enabling releasable connection of one of said holder members with another holder member.

2. An assembly as set forth in claim 1 wherein:
    (a) said content article is a substantially standard compact disc; and
    (b) said holder member is sized and shaped to receive said compact disc therein.

3. An assembly as set forth in claim 2 wherein:
    (a) said content article is a booklet from a compact disc package; and
    (b) said holder member is sized and shaped to receive said booklet therein.

4. An assembly as set forth in claim 1 wherein:
    (a) said holder member includes an elongated tongue extending along an edge of said holder member;
    (b) said connector member includes an elongated groove which is complementary to said tongue of said holder member;
    (c) engagement of said tongue and groove enabling releasable connection of said connector member to said holder member;
    (d) said connector member further includes:
        (1) an elongated connector tongue extending thereal- ong; and
        (2) an elongated connector groove extending thereal- ong; and
    (e) engagement of a connector tongue of one connector member with a connector groove of another connector member enabling releasable connection of said holder member with another holder member.

5. An assembly as set forth in claim 1 and including:
    (a) a plurality of connector members engaged with said holder and adapted to releasably interconnect said holder member with another recorded medium holder member.

6. An assembly as set forth in claim 1 and including:
    (a) a recorded medium cleaning member positioned within said holder member to engage a recorded medium upon insertion into or removal from said holder member, to thereby clean said recorded medium.

7. An assembly as set forth in claim 1 and including:
    (a) said holder member being internally configured so that a portion of a recorded medium protrudes from said holder member upon being fully inserted into said holder member to thereby facilitate grasping said recorded medium for removal.

8. A stacking holder assembly for a content article of a compact disc package including a compact disc or a compact disc package booklet, and said assembly comprising:
    (a) a content article holder member sized and shaped to receive a content article of a compact disc package therein;
    (b) an elongated holder tongue formed along an edge of said holder member; and
    (c) a connector member adapted to interconnect said holder member with another content article holder member and including:

(1) an elongated holder groove sized and shaped to receive said holder tongue therein;
(2) an elongated connector tongue formed on said connector member; and
(3) an elongated connector groove sized and shaped to receive a connector tongue of another connector member therein.

9. An assembly as set forth in claim 8 wherein:
(a) said content article is a substantially standard compact disc; and
(b) said holder member is sized and shaped to receive said compact disc therein.

10. An assembly as set forth in claim 8 wherein:
(a) said content article is a booklet from a compact disc package; and
(b) said holder member is sized and shaped to receive said booklet therein.

11. An assembly as set forth in claim 8 and including:
(a) a plurality of connector members engaged with said holder and adapted to releasably interconnect said holder member with another content article holder member.

12. An assembly as set forth in claim 8 wherein said content article is a compact disc and said assembly including:
(a) a compact disc cleaning member positioned within said holder member to frictionally engage a compact disc upon insertion into or removal from said holder member to thereby clean said compact disc.

13. An assembly as set forth in claim 8 and including:
(a) said holder member is internally configured so that a portion of a content article protrudes from said holder member upon being fully inserted into said holder member to thereby facilitate grasping said content article for removal.

14. A stacking holder assembly for a content member of a compact disc package and comprising:
(a) a relatively thin, flattened, substantially square content receptacle which is sized and internally configured to receive said content member therein;
(b) said receptacle having corner regions which are mitered to form bevel surfaces;
(c) a respective elongated receptacle tongue extending along each of said bevel surfaces; and
(d) a plurality of connector members respectively for said bevel surfaces, each connector member including:
(1) an elongated receptacle groove formed on said connector member which is sized and shaped to receive said receptacle tongue therein;
(2) an elongated connector tongue formed on said connector member; and
(3) an elongated connector groove formed on said connector member which is sized and shaped to receive a connector tongue of another connector member therein to thereby enable removable interconnection of said receptacle to another similar receptacle.

15. An assembly as set forth in claim 14 wherein:
(a) said content member is a substantially standard compact disc; and
(b) said receptacle is sized and shaped to receive said compact disc therein.

16. An assembly as set forth in claim 14 wherein:
(a) said content member is a booklet from a compact disc package; and (b) said receptacle is sized and shaped to receive said booklet therein.

17. An assembly as set forth in claim 14 wherein said content member is a compact disc, and including:
(a) a compact disc cleaning member positioned within said receptacle to engage said disc upon insertion into or removal from said receptacle to thereby clean said disc.

18. An assembly as set forth in claim 14 and including:
(a) said receptacle being internally configured so that a portion of said content member protrudes from said receptacle upon being fully inserted into said receptacle to thereby facilitate grasping said content member for removal.

19. A modular holder rack assembly for a plurality of content members of compact disc packages, said content members including compact discs and/or compact disc booklets, and said assembly comprising:
(a) a plurality of compact disc package content member receptacles, each receptacle being sized and shaped to receive a respective one of said content members therein;
(b) each receptacle including an elongated receptacle tongue extending along an edge thereof;
(c) a plurality of connector members engaged with said receptacles in such a manner as to releasably interconnect said receptacles into a modularly expandable rack to hold said plurality of content members;
(d) each connector member including an elongated receptacle groove which is complementary to the receptacle tongue of each receptacle;
(e) engagement of a receptacle tongue of a receptacle and a receptacle groove of a connector member enabling releasable connection of said connector member to said receptacle;
(f) each connector member further including:
(1) an elongated connector tongue extending therealong; and
(2) an elongated connector groove extending therealong; and
(g) engagement of a connector tongue of one connector member with a connector groove of another connector member enabling releasable connection of one of said receptacles with another of said receptacles.

20. A stacking holder assembly for a content article of a compact disc package and comprising:
(a) a content article holder member sized and shaped to receive a content article of a compact disc package therein;
(b) said holder member including an elongated holder tongue extending along an edge of said holder member;
(c) a connector member releasably engaged with said holder member and adapted to modularly and releasably interconnect said holder member with another content article holder member;
(d) said connector member including an elongated holder groove which is complementary to said holder tongue of said holder member;
(e) engagement of said holder tongue and said holder groove enabling releasable connection of said connector member to said holder member;
(f) said connector member further including:
(1) an elongated connector tongue extending therealong; and (2) an elongated connector groove extending therealong; and (g) engagement of a connector tongue of one connector member with a connector groove of another connector member enabling releasable connection of said holder member with another holder member.

* * * * *